Nov. 14, 1933.  W. A. GORDON  1,935,050
MACHINE FOR PLASTICATING MATERIALS
Filed Nov. 29, 1930  2 Sheets-Sheet 1
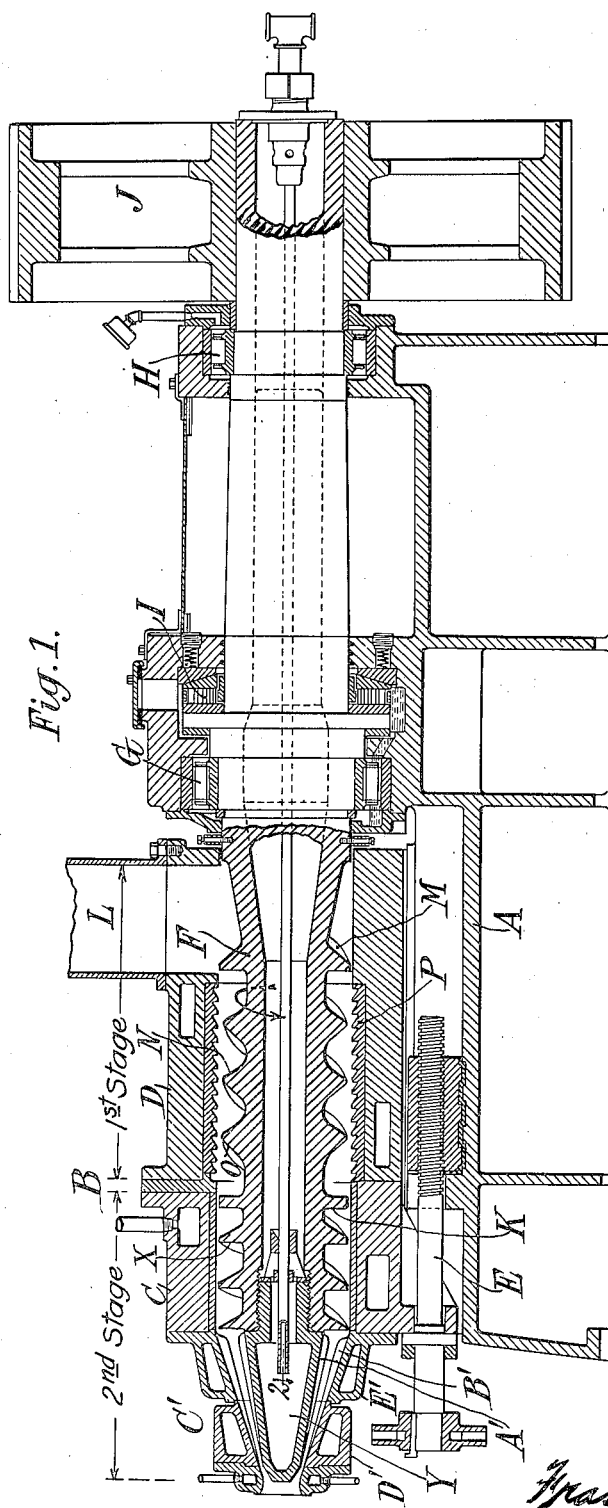
INVENTOR
William A. Gordon,
By Attorneys, Nov. 14, 1933.  W. A. GORDON  1,935,050
MACHINE FOR PLASTICATING MATERIALS
Filed Nov. 29, 1930  2 Sheets-Sheet 2
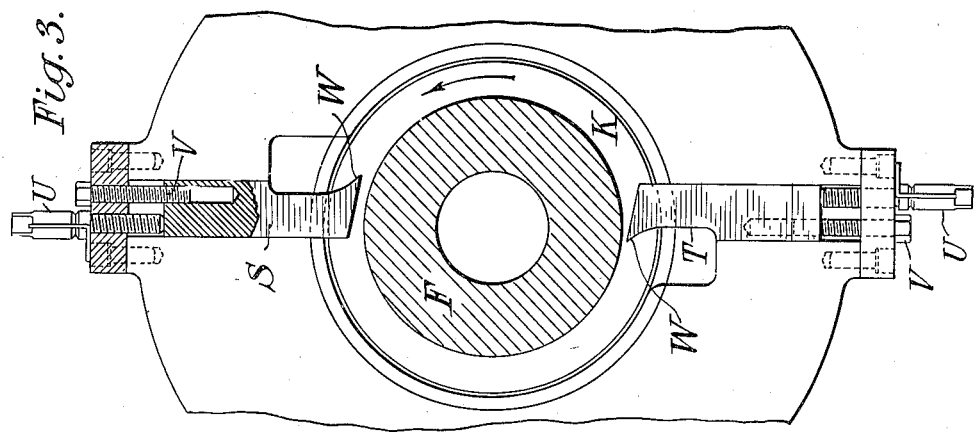
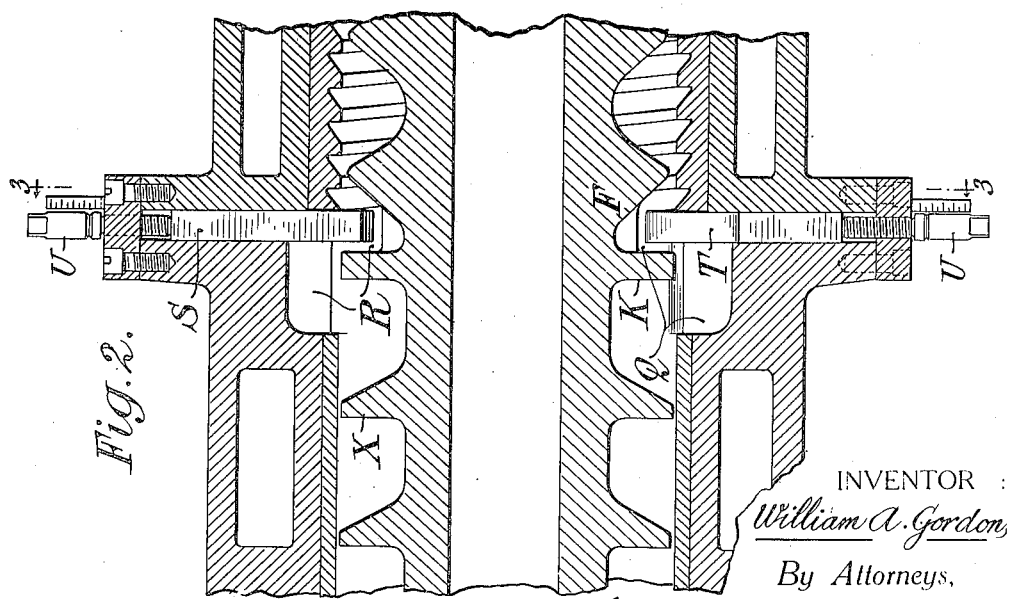
INVENTOR:
William A. Gordon,
By Attorneys, Patented Nov. 14, 1933

1,935,050

UNITED STATES PATENT OFFICE 1,935,050

MACHINE FOR PLASTICATING MATERIALS

William A. Gordon, Shelton, Conn., assignor to Farrel-Birmingham Company, Incorporated, Ansonia, Conn., a corporation of Connecticut Application November 29, 1930
Serial No. 498,985

7 Claims. (Cl. 18—12)

In applications Nos. 357,396 and 445,665 I have described and claimed machines for working material, especially adapted for the so-called plasticating of rubber. It is a characteristic of the machines forming the subject matter of these applications that the plasticating is performed in two stages, the particular type of machines illustrated comprising two screws or worms mounted side by side and preferably one above the other. The machines illustrated in the aforesaid applications have proven to be very effective but have necessarily involved means for mounting the two screws, means for driving them, and other devices incident to the dual operation therein set forth.

According to the present invention I provide a machine of this type, namely, one in which the plasticating is performed in two stages, as before, but in which the entire machine is simplified and rendered more economical to construct. The present machine is particularly useful in the smaller sizes of plasticators designed for use when a large quantity of plasticated material is not desired.

To this end I utilize a single screw, the actuating portions of which are designed to operate in two stages as before, but which according to the present invention are arranged in line or end to end, so that the material travels, generally speaking, in a single direction. The invention includes other features of construction which will be hereinafter more fully described.

Referring to the drawings which illustrate one form of the invention,—

Figure 1 is a central, vertical, longitudinal section of the preferred form of the invention, portions of the figure being shown in elevation.

Fig. 2 is an enlarged horizontal, longitudinal section of a portion of the screw member and casing.

Fig. 3 is an enlarged transverse, vertical section, taken on the line 3—3 in Fig. 2.

Referring to the drawings, let A indicate the bedplate of the machine, B a sliding housing formed in two parts C and D, which is adapted to be longitudinally adjusted by an adjusting screw E. F indicates the worm or screw member, the active portion of which projects into the housing B and the rear portion of which is held in bearings in the bed-plate. Preferably these bearings are of the anti-friction type shown as roller bearings G and H. A thrust bearing I is provided which is shown as arranged between the bearings G and H, and which is adapted to the machine, that is to say, from left to right in Fig. 1. The machine is driven in any suitable way, as by means of a large gear J connected with any suitable driving gear.

The actuating part of the screw or worm F is divided into two stages which are denominated in the drawings as the first stage and the second stage respectively. These stages are in general separated by a flange K formed on the actuating portion of the screw member, which flange is preferably annular, so that it forms a substantial abutment for the material as hereinafter described.

The first stage of the apparatus is characterized by a conformation of screw-thread on the member F which is designed to initially receive the material to be plasticated from a hopper L and to break up or sever the material as it is being fed and to rapidly press it forward (to the left in Fig. 1) beyond the confines of the hopper. This section of the thread is designated by the reference letter M, and is similar to that shown in my application No. 445,665. The section M presents the partly broken material to the action of the section N, the characteristic construction of which is such as to work the material in such fashion that it is forced forwardly (to the left) and then backwardly (to the right) over the tops of the threads or convolutions. The design of the section N is hence not primarily that of a conveyor screw, the axial feed of the material being subordinated to the radially outward feed, so that the material instead of being jammed forwardly against the flange K is partially forced radially outward, so that it can flow back over the tops of the threads, and hence be reworked. To this end the advancing face of the threads is oblique, as shown at O. To assist in the forward feed of the material, I preferably provide the interior of the housing with threads P, whose forward faces preferably lie in substantially a vertical plane and whose rearward faces are inclined. The direction of the threads P is such as to assist in the forward feed of the material, thus supplying any deficiencies of the threads N, and permitting the latter to place as much outward pressure on the material as may be desired to secure the action intended. The flowing back of the material over the tops of the threads is permitted by the annular space left between the tops of the threads N and the threads P.

The material having been worked in the first stage is in the construction shown prevented from direct flow into the second stage by the flange Referring now to Figs. 2 and 3, it will be seen that means are provided for by-passing limited quantities of material around the flange K into the sphere of operation of the second stage of the device. This means for by-passing comprises two passages in the housing lettered Q and R, which passages are shown as arranged close to the flange K. Into the space between said flange and the last convolution of the screw-thread N is arranged a plow or plows S and T, which are adjustably mounted in the housing by means of screws U and V, which act to hold the plows rigidly in any adjusted position. The plows are preferably provided with acute cutting portions W (Fig. 3) which are designed to enter the mass of partly plasticated material delivered by the screw N, and to divert a portion of the same into the passages Q and R. Fig. 3 best illustrates this construction, the screw rotating in the direction of the arrow.

An important effect of the plows is that the material is put under heavy pressure in the annular chamber in which the plows work and probably also in the passages Q and R, so that it is already under considerable pressure when it is delivered to the second stage of the apparatus.

When material thus partially plasticated is delivered to the second stage of the machine, it comes under the influence of threads X. These threads contrary to those of the first stage are designed primarily as pressure or forcing threads whose function is mainly to press the material forward under very considerable pressure toward the kneading head Y. Their action is considerably augmented by the fact that the material is already under pressure when fed to such threads. This kneading head Y is preferably a cone-shaped member with ribs or other projections A' which are designed to coact with similar ribs B' formed on a kneading housing C' which is shown as constructed in two parts D' and E'. In the main this construction of housing and kneading head is that shown in my two prior applications hereinbefore referred to.

By reason of the preliminary working, warming and breaking up of the material in the first stage it is in such condition when it reaches the second stage as to be capable of being properly fed under pressure to the screw X and by it to the action of the kneading head. In this head it undergoes its final plastication and issues from the head in proper condition for the next succeeding operation whatever that may be. Adjustment of the adjusting screw E slides the housing B to the right or left to adjust the space between the kneading head Y and its housing. Suitable dies are customarily bolted on the housing of the kneading head to give the issuing material any shape which is desired.

The interior of the screw, the housings, the main housing and the kneading head and its housing are all preferably provided with means for controlling their temperatures by steam or water as may be required.

While I have shown and described one form of the invention, it will be understood that I do not wish to be limited thereto, since various modifications may be made therein without departing from the spirit of the invention.

What I claim is:

1. A machine for plasticating rubber materials comprising mechanism for plasticating in two stages, each of which has a movable section and a stationary section, the two movable sections being mounted in axial alinement, the first movable and stationary sections being constructed to crush, work, rework and warm the material, and the second movable and stationary sections being constructed to grind or knead the material, and means for driving the first movable section, motion to the second movable section being transmitted by the first movable section.

2. A machine for plasticating rubber materials comprising mechanism for plasticating in two stages, each of which has a movable section and a stationary section, the two movable sections being mounted in axial alinement, the first movable and stationary sections being constructed to crush, work, rework and warm the material, and the second movable and stationary sections being constructed to grind or knead the material, and means arranged between the two stages to back up the material toward the first section, whereby the same is reworked, the parts having a passageway which permits predetermined amounts of material to pass from the first stage to the second stage.

3. A machine for plasticating rubber materials comprising mechanism for plasticating in two stages, each of which has a movable section and a stationary section, the two movable sections being mounted in axial alinement, the first movable and stationary sections being constructed to crush, work, rework and warm the material, and the second movable and stationary sections being constructed to grind or knead the material, means arranged between the two stages to back up the material toward the first sections, whereby the same is reworked, the parts having a passageway which permits peredetermined amounts of material to pass from the first stage to the second stage, and means for assisting the passage of such material between the two stages.

4. A machine for plasticating rubber materials comprising mechanism for plasticating in two stages, each of which has a movable section and a stationary section, the two movable sections being mounted in axial alinement, the first movable and stationary sections being constructed to crush, work, rework and warm the material, and the second movable and stationary sections being constructed to grind or knead the material, means arranged between the two stages to back up the material toward the first sections, whereby the same is reworked, the parts having a passageway which permits predetermined amounts of material to pass from the first stage to the second stage, and means for assisting the passage of such material between the two stages, comprising a plurality of adjustable plows adapted to divert material at the end of the first stage into said passageway.

5. A machine for plasticating materials, comprising mechanism for plasticating in two stages, the first of which is constructed to crush and warm the material and the second of which includes a grinding or kneading section, said mechanisms being mounted in axial alinement, means for intercepting the passage of material from the first stage to the second stage, means for feeding desired quantities past said intercepting means, said means comprising a by-pass around said intercepting means, and a plow adapted to divert material through said by-pass.

6. A machine for plasticating rubber materials, comprising mechanism for plasticating in two stages, said mechanism comprising a casing, a single worm therein having threads whose forward faces are inclined rearwardly, and are of less diameter than the interior of the casing, and threads whose forward faces are substantially transverse, and a kneading mechanism at the end of said last-named threads, and said worm also having an intercepting flange with means for governing the flow of material past said flange.

7. A machine for plasticating materials, comprising mechanism for plasticating in two stages, said machine comprising a housing provided with a feed opening, a single worm, one end of which is located in said housing, and said worm having its threads adjacent to said housing with their forward edges inclined rearwardly, and the diameter of said worm at the high points of said threads being less than the internal diameter of the housing, whereby material is forced outwardly and rearwardly, and said worm having an intercepting flange, said housing having opposite said flange a by-pass through which material may flow, a plow for diverting material around said flange through said by-pass, and said worm having threads with substantially radial forward sides, whereby to convey said material under pressure in a forward direction, and said worm also carrying a kneading head, and said housing carrying a supplemental housing for said kneading head.

WILLIAM A. GORDON.